US012727688B1

(12) United States Patent
Coleman et al.

(10) Patent No.: US 12,727,688 B1
(45) Date of Patent: Sep. 8, 2026

(54) TOKEN PRESENTATION SYSTEM

(71) Applicant: Brett Coleman, Garden Grove, CA (US)

(72) Inventors: Brett Coleman, Garden Grove, CA (US); Mathew Schaffrath, Santa Ana, CA (US)

(73) Assignee: Brett Coleman, Garden Grove, CA (US)

( * ) Notice: Subject to any disclaimer, the term of this patent is extended or adjusted under 35 U.S.C. 154(b) by 0 days.

(21) Appl. No.: 19/327,634

(22) Filed: Sep. 12, 2025

(51) Int. Cl.
*A47G 1/12* (2006.01)
*H01F 7/02* (2006.01)

(52) U.S. Cl.
CPC ............. *A47G 1/12* (2013.01); *H01F 7/0252* (2013.01)

(58) Field of Classification Search
CPC .. A45C 1/00; A47G 1/12; B65D 25/10; G09F 5/00; H01F 7/02; H01F 7/0252
USPC ..... 206/0.8, 0.81, 0.82, 0.83, 0.84, 445, 804
See application file for complete search history.

(56) References Cited

U.S. PATENT DOCUMENTS 3,655,065 A * 4/1972 Yellin .................... A47B 87/02 312/111
3,673,724 A 7/1972 Bell
4,043,477 A 8/1977 Deese
4,063,639 A * 12/1977 Grant ........................ A47G 1/12 206/0.82
4,385,688 A * 5/1983 Grant ........................ B42F 5/00 206/0.82
4,771,890 A * 9/1988 Hofland ................. G11B 23/03 206/445
5,544,438 A 8/1996 Fazekas
6,412,626 B2 * 7/2002 Krull .......................... G09F 5/00 206/0.8
7,299,918 B1 11/2007 Patrick
8,177,057 B1 * 5/2012 Krull ...................... G09B 19/18 206/0.8
8,408,387 B2 * 4/2013 Sottile ...................... A45C 1/10 206/0.82
9,687,091 B2 6/2017 Jhagroo
2003/0226300 A1 12/2003 Ootsuka

FOREIGN PATENT DOCUMENTS

JP 2009112697 A 5/2009
JP 3231977 U * 5/2021
WO WO-02065410 A2 * 8/2002 ............. G07D 9/002

* cited by examiner

*Primary Examiner* — Bryon P Gehman
(74) *Attorney, Agent, or Firm* — DANE IP Law PC

(57) ABSTRACT

A display presentation system for tokens includes a plurality of modular holders. Each modular holder includes a housing having a front surface. A recessed surface extends below the front surface. A ledge is present in the recessed surface. A magnet or metal layer is under a token and on a floor of the housing. A clearance space is present between an edge of the token and the ledge. The edge of the token is tiltable into the clearance space to remove the token from the recessed surface in the housing. The display presentation system further includes a system of fasteners. The plurality of modular holders are connectable into a variety of shapes via the system of fasteners.

10 Claims, 9 Drawing Sheets

TOKEN PRESENTATION SYSTEM

CROSS-REFERENCE TO RELATED APPLICATIONS

None.

FIELD OF INVENTION

The present disclosure relates to display systems, and more particularly to a token presentation system.

BACKGROUND

Recovery from addiction is a challenging journey that often involves support systems, personal milestones, and tangible reminders of progress. Many individuals in recovery programs receive tokens, coins, chips, or medallions to commemorate periods of sobriety or other achievements. These tokens can serve as powerful motivators and reminders of the commitment to maintaining a healthy lifestyle.

In some systems, as one reaches a new milestone, a new token is received. Traditionally, recovery tokens have been stored in various ways, such as in drawers, boxes, or simple display stands, especially when one receives a new token, the old tokens are stored away. Some individuals carry the latest token on their person to remind them of their achievement and to motivate themself when facing a challenging moment. However, these storage methods may not adequately showcase the significance of these achievements or allow for easy viewing and reflection. A singular token may not seem like much to an outsider. However, each token on the step to recovery represents a significant achievement in the aggregate that can provide an impact when the many tokens are seen simultaneously. However, as an individual's collection of tokens grows over time, it can become difficult to display them in a cohesive and meaningful manner. To reiterate, most tokens, when replaced by a newer achievement, are stored away out of sight. Being out of sight can reduce the impact of the tokens because the individual may only see the current token and forget that the current token actually represents the many tokens in aggregate that came before the latest token. When a person in recovery shows a singular token to another person, the singular token can have a limited effect or have an easily dismissed impression.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a display presentation system for at least one token is provided. The display system includes a plurality of modular holders. Each modular holder includes a housing having a front surface. A recessed surface extends below the front surface. A ledge is present in the recessed surface. A magnet or metal layer is under the token and on a floor of the housing. A clearance space is present below an edge of the token and above the ledge. The edge of the token is tiltable into the clearance space to remove the token from the recessed surface in the housing. The display presentation system further includes a system of fasteners. The plurality of modular holders are connectable into a variety of shapes via the system of fasteners.

According to other aspects of the present disclosure, modular display system is provided that includes a plurality of hexagonal housings having a front surface and six sidewalls. A removable token is configured to attach to the front surface of the hexagonal housing. A plurality of fasteners are configured to connect adjacent sidewalls of adjacent hexagonal housing together. The plurality of hexagonal housings are configured to be re-configured at will by disconnecting and reconnecting the fasteners and reconnecting the plurality of hexagonal housings into a plurality of user designed shapes.

According to another aspect of the present disclosure, a display presentation system for displaying a plurality of tokens is provided that includes a plurality of modular holders. Each modular holder includes a housing having a front surface. A recessed surface extends below the front surface. A floor is present at a bottom of the recessed surface. A metal layer is positioned on top of the floor and under the token. The metal layer has a circumference smaller than a circumference of the token. A magnet is positioned on top of the floor and under the token. The magnet has a circumference smaller than the circumference of the token. Either the magnet or the metal layer are attached to the token and cooperate to provide a magnetic force attaching the token to the housing. An empty space is present between a sidewall of the recessed surface and edges of the metal layer and magnet. An edge of the token is tiltable into the empty space to break the magnetic force and remove the token from the housing. The display presentation system further includes a system of fasteners. The plurality of modular holders are connectable in multiple directions into a variety of user designed shapes via connection and reconnection of the system of fasteners to the plurality of modular holders.

The foregoing general description of the illustrative aspects and the following detailed description thereof are merely exemplary aspects of the teachings of this disclosure and are not restrictive.

DETAILED DESCRIPTION

Figure 1:
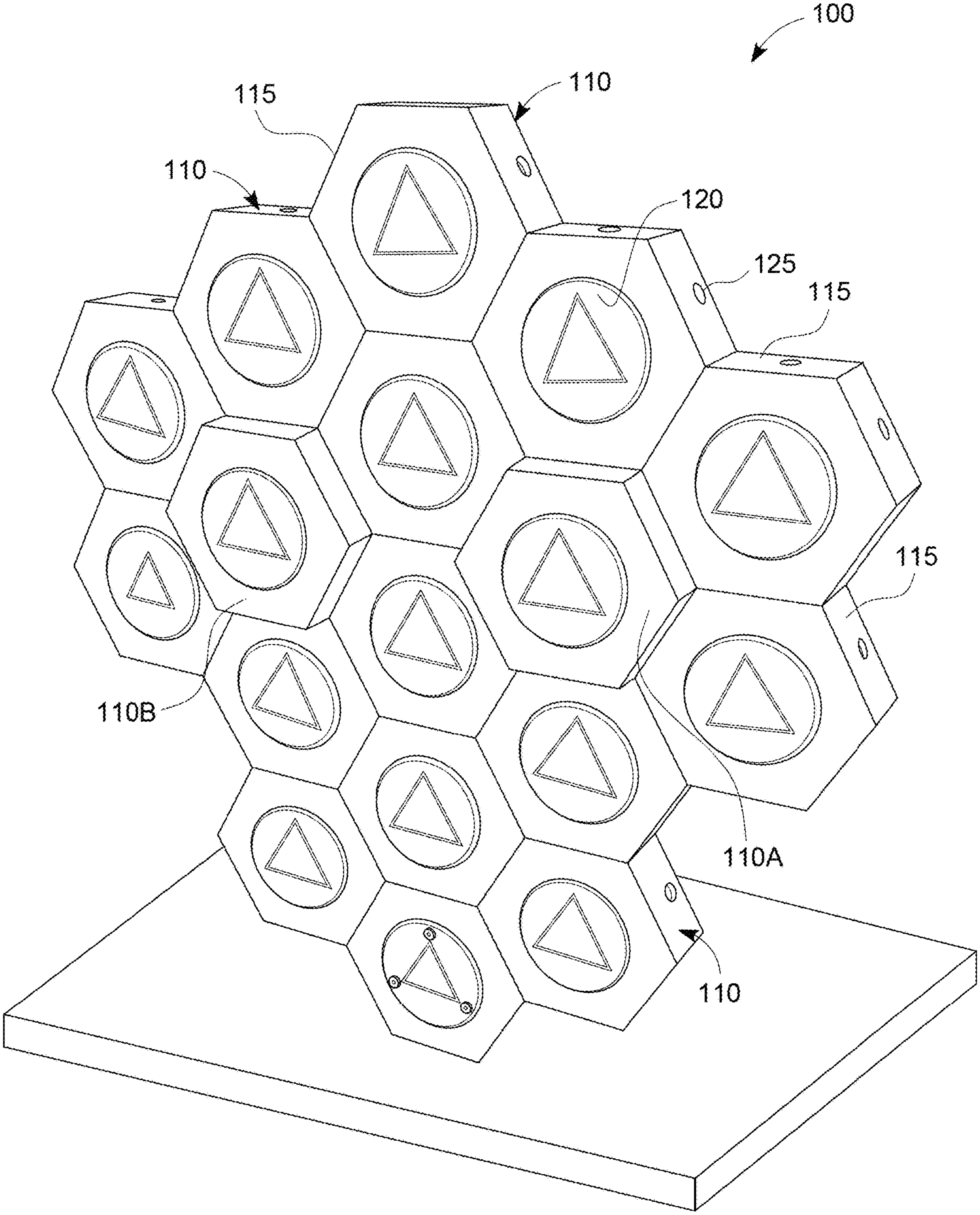
FIG. 1 is a front perspective view of a token presentation system in accordance with an aspect of the subject.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The token presentation system described herein provides a modular and customizable display for tokens. "Tokens" as used herein may be medallions, coins, chips, medals, insignias, ribbons, or pendants. The system comprises a plurality of modular holders that may be arranged in various geometric configurations to create personalized displays. In some aspects, the modular holders may be fabricated through injection molding processes, allowing for efficient and cost-effective production. The subject system allows for flexible arrangement and expansion as new tokens are acquired. The system enhances the motivational aspect of token collection by creating a visually appealing display that grows alongside an individual's recovery journey. In addition, tokens may be easily removed from a holder for convenience during creation of a new arrangement.

Current display options for tokens and medallions often lack customization features or the ability to easily rearrange and expand the presentation. Many existing solutions are static in nature, limiting the user's ability to interact with and modify the display as their collection evolves. A modular approach to token presentation addresses many of these limitations. By allowing users to connect individual display units in various configurations, the modularity of the system provides greater flexibility and personalization. The system also facilitates the creation of visually interesting patterns or shapes that reflect the user's preferences or the symbolic meaning of their token collection.

The modular holders may be engineered to securely hold and display tokens while also allowing for easy removal or rearrangement. This feature facilitates the updating of displays as users acquire new tokens or wish to reconfigure their presentation. The system thus combines functionality with adaptability, catering to the evolving needs of users in recovery programs or other token-based recognition systems. In some aspects, magnetic elements may be incorporated into the system offering additional benefits. Magnetic attachment methods may provide secure yet easily removable mounting options for tokens, allowing users to interact with and modify their token collection more freely. This could encourage regular engagement with the tokens, reinforcing their role as reminders and motivators in the recovery process. The modular nature of the system enables users to expand or modify their displays as desired. The holders may be connected to form different geometric patterns or arrangements, accommodating collections of varying sizes. This flexibility allows the system to grow alongside a user's recovery journey or token collection.

In some implementations, the token presentation system may be designed for wall mounting, providing a prominent and visible display of recovery progress. Alternatively, the system may be configured for placement on a desk or other flat surface, offering a more portable or compact display option. The versatility in mounting options allows users to integrate the token presentation system into various environments or settings.

As will be appreciated, the versatility the token presentation system provides has applications beyond recovery programs. Similar concepts may be applied to other fields where achievement tokens are awarded, such as academic accomplishments, professional certifications, or personal goal tracking.

Referring now to FIG. 1, a token presentation system 100 (sometimes referred to simply as the "system 100") is shown according to an aspect. The system 100 may include a plurality of modular holders 110. The modular holders 110 are described as "modular" because each one can be connected and rec-connected to one or more other modular holders 110 to provide different overall shapes of the system 100. Each modular holder 110 may be configured to receive and display a token 120. While the same token 120 is shown in the figure, it will be understood that in practice, the tokens 120 may each have different designs. In addition, the term "front" as used herein is relative but should be generally understood to mean the direction in which the tokens 120 are facing to be seen when presented.

FIG. 1 illustrates a perspective view of the token presentation system 100 comprising multiple modular holders 110 arranged in a free-standing and arbitrary pattern. The modular holders 110 may include multiple sides (or sidewalls) 115. In some aspects, the modular holder 110 may have six sidewalls 115 that are arranged hexagonally. The hexagonal configuration of modular holders 110 provides both stable and versatile arrangements of the system 100.

Figure 7:
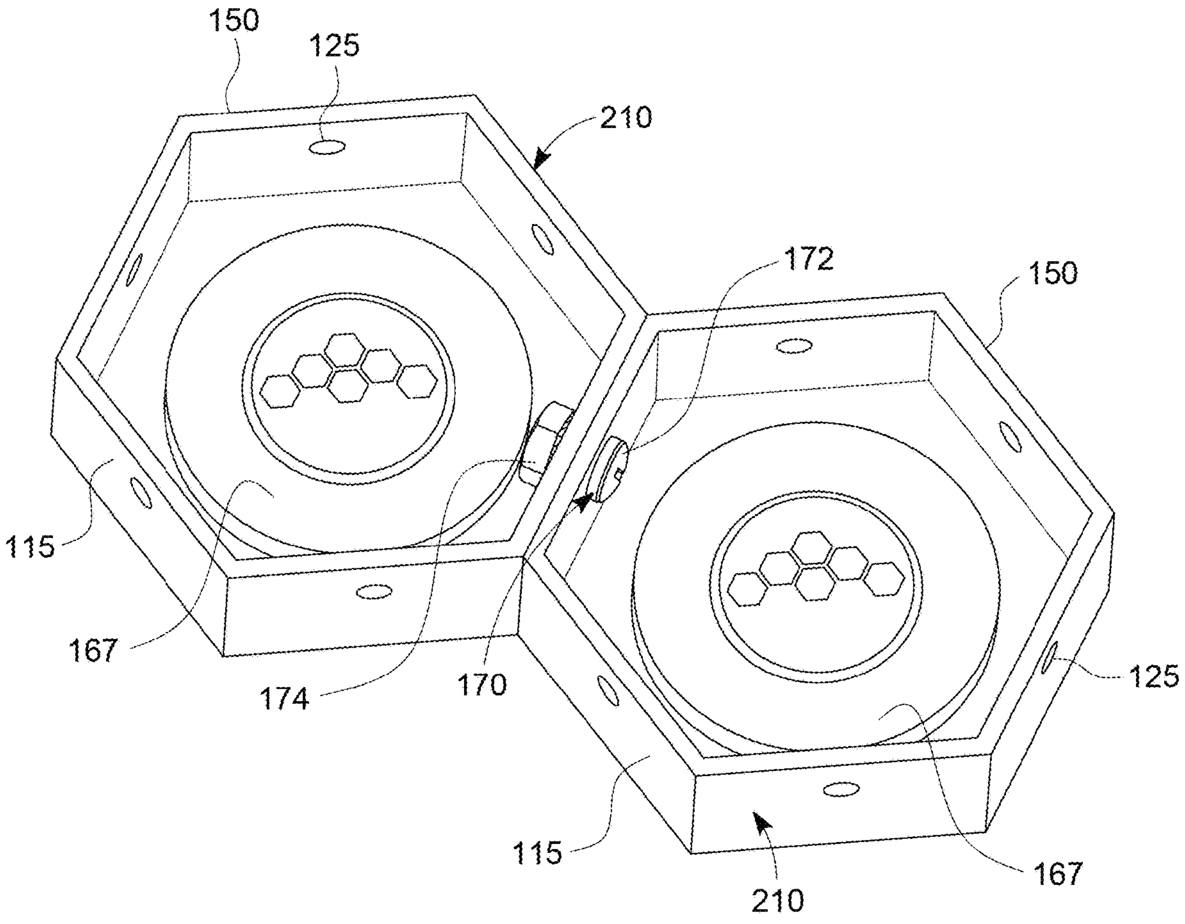
FIG. 7 is a perspective rear view of two modular holders attached together, consistent with aspects.

One or more sides 115 may include a hole 125 for receipt of a fastener 170 (an example of which can be seen in FIG. 7). The fasteners 170 may be used to connect two adjacent sides 115 of adjacent modular holders 110 together. However, use of fasteners 170 may be at the user's discretion allowing for flexibility in the presentation of tokens 120 in the system 100. For example, some modular holders 110 may be unsecured by fasteners 170 allowing for variation in the presentation. Some modular holders 110 may be raised or pushed forward from adjacent modular holders 110. Modular holders 110A and 110B show two instances of modular holders 110 protruding out from the surrounding modular holders 110 providing a simulated embossed appearance for those holders 110A and 110B. While not illustrated, it may also be appreciated, that the modular holders 110 may be recessed from a front plane toward the rear of the system 100 from surrounding modular holders 110 providing additional aesthetic configuration options for the system 100.

Figure 9:
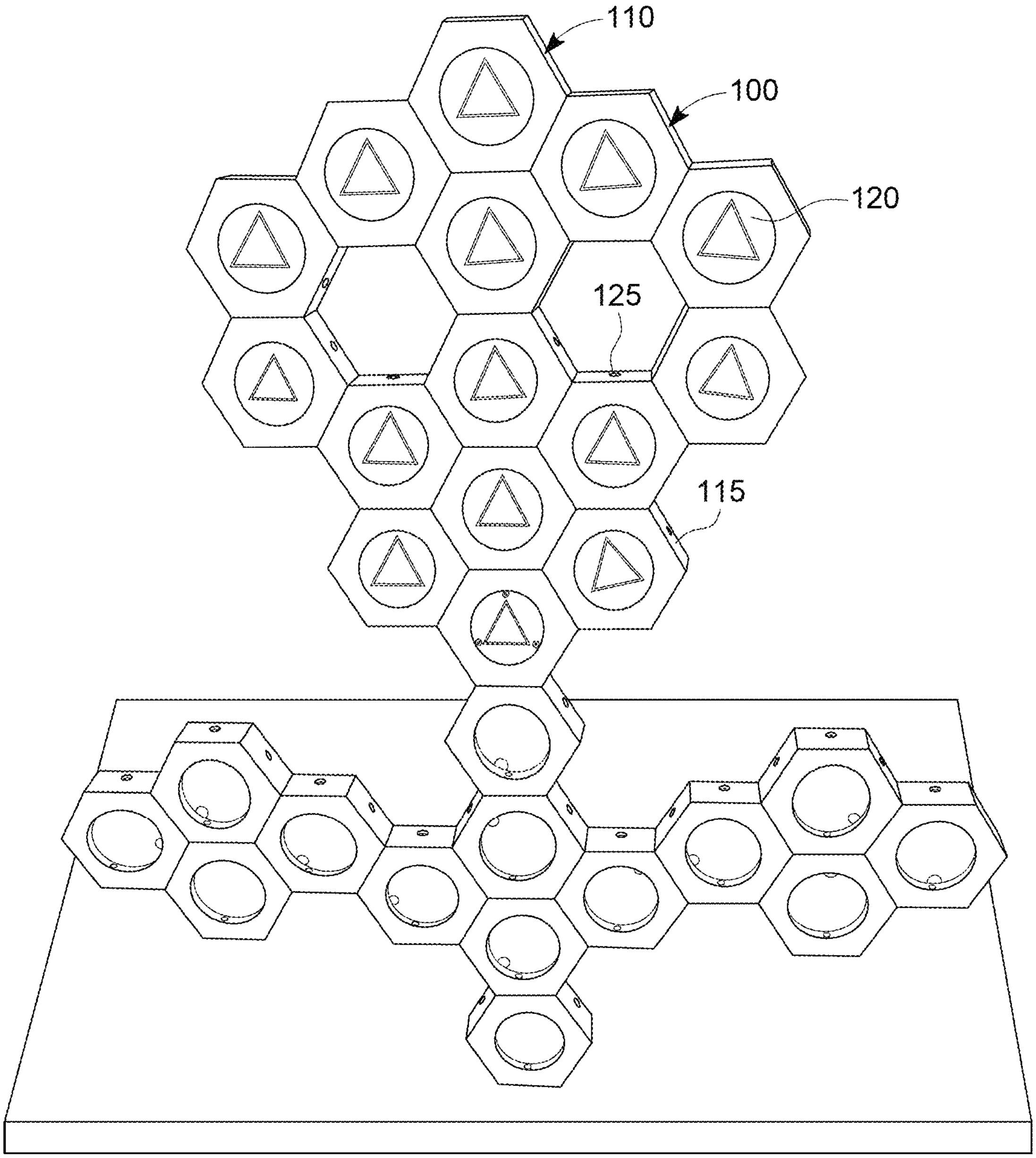
FIG. 9 is a front perspective view of a system for presentation of tokens, re-arranged and consistent with aspects.

The thickness of sides 115 may be approximately 2 mm, and sometimes range between 1 mm to 3 mm. As may be appreciated, the dimensions (thickness, length, and width) of sides 115 are sufficient to provide a stable base when the system 100 is placed on a platform surface (for example, a table, shelf, etc.) so that even a single side 115 is able to support an entire system 100 of multiple modular holders 110 in multiple arbitrary arrangements as shown in FIG. 1 and FIG. 9. Additional details of the modular holder 110 are provided below with reference to the remaining figures. While describing the modular holders 110, some references back to the system 100 and FIG. 1 may be made.

Figure 2A:
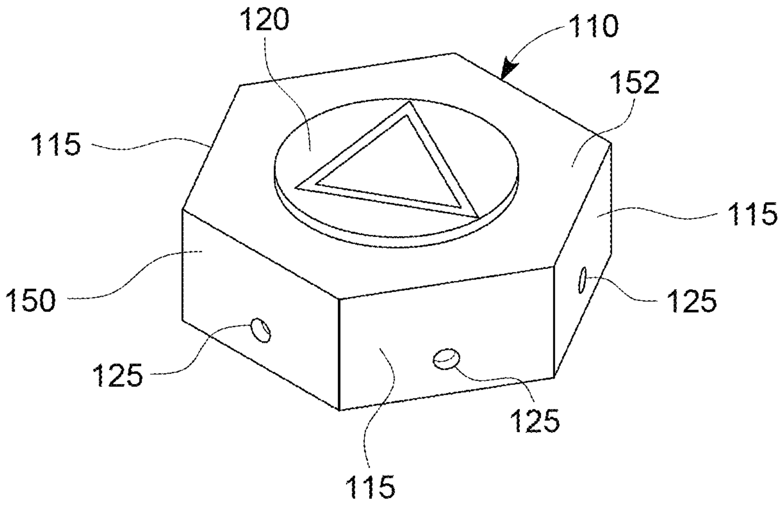
FIG. 2A is a front perspective view of a modular holder in the system of FIG. 1, in accordance with an aspect.
Figure 2B:
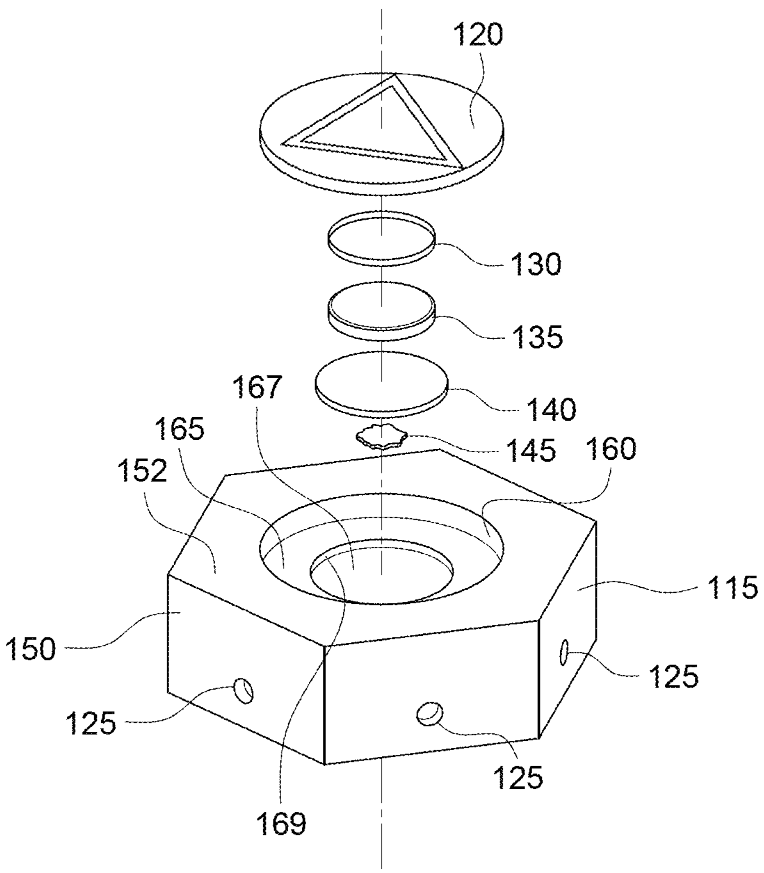
FIG. 2B is an exploded view of the modular holder of FIG. 2A.

Referring now to FIG. 2A and FIG. 2B, the modular holder 110 is shown according to an aspect. The modular holder 110 may include a hexagonal housing 150 with a top or front face surface 152. The housing 150 may include a recessed sidewall 160 that provides a depression extending downward from the top surface 152 to form a ledge 165. A floor 167 may be centralized inside a well 169 that is recessed further below the ledge 165. The recessed sidewall 160 may be sized to accommodate the circumference of the token 120. The token 120 may rest entirely outside of the depression, at least partially inside the depression, or completely inside the depression.

In some aspects, the token 120 may be exchanged out of the modular holder 110 via a removable attachment system. For example, one or more support features may be present under the token 120 between the rear surface of the token 120 and the floor 167. In one aspect, a metal layer 140 (such as a disk or plate with ferrous material) may be secured to the floor 167 by a layer of permanent adhesive 145. The metal layer 140 may fit within the well 169 inside the ledge 165 thus providing clearance for the thickness of the token 120. In some aspects, the token 120 may have a magnet 135 attached to the bottom side of the token 120 by a layer of double-sided adhesive 130. In the arrangement shown, the magnet 135 is disposed to make contact with the metal layer 140 creating a magnetic attraction that removably secures the token 120 above or on top of the ledge 165 and within the recessed sidewall 160. As will be discussed in further detail that follows, the arrangement of support elements under the token 120 in the modular holder 110 provides ease of exchanging out tokens 120 from the housing 150 and/or ease of changing the orientation of their display.

Figure 3A:
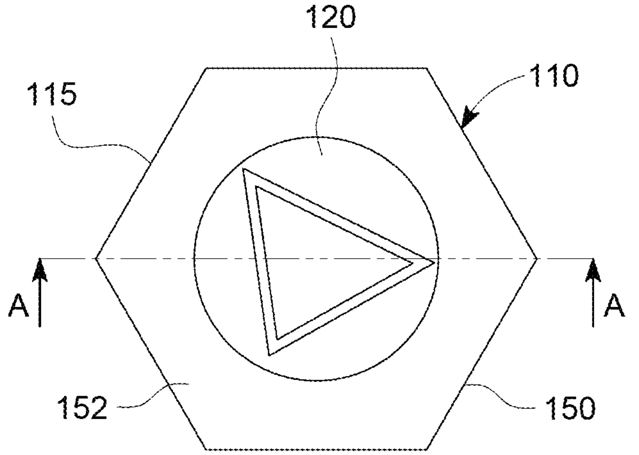
FIG. 3A is a top view of the modular holder of FIG. 2A.
Figure 3B:
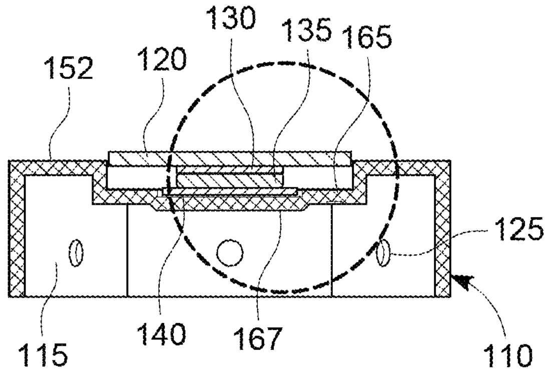
FIG. 3B is a cross-sectional view taken along the line A-A of FIG. 3A.
Figure 3C:
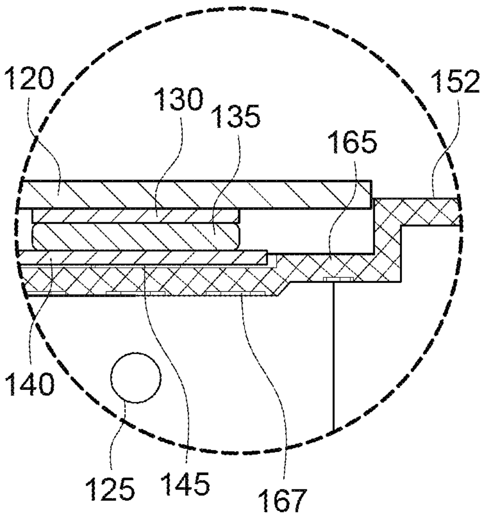
FIG. 3C is an enlarged view of the circle shown in FIG. 3B.

FIGS. 3A, 3B, and 3C show various views of the modular holder 110 holding a token 120 in a first orientation. As can be seen in FIGS. 3B and 3C, the circumferences of the adhesive layer 130, the magnet 135, and the metal layer 140 stacked below the token 120 may each be smaller than the circumference of the token 120. Referring to the triangular symbol of the front face 152 of the token 120, it can be seen that one of the apexes is pointed to the right proximate the cross-section line "A". In some aspect, the thicknesses of the elements stacked below the token 120 may be arranged so that part of the thickness of the token 120 protrudes above the front face 152 to provide an embossed appearance as shown in FIG. 3B. However, it will be understood that other aspects may be configured so that the front surface of the token 120 is flush with the front face 152 of housing 150.

Figure 4A:
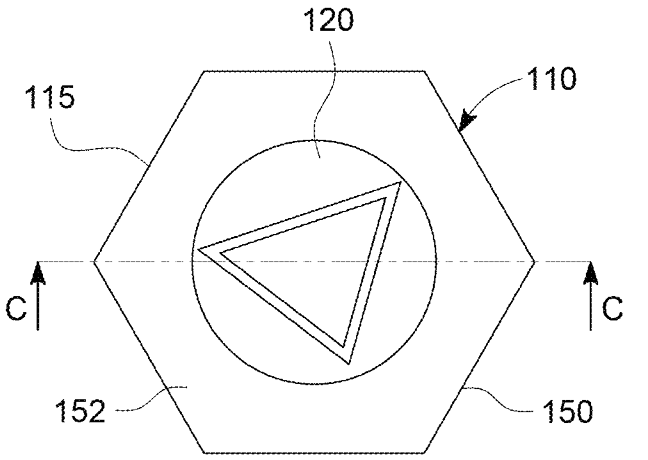
FIG. 4A is a top view of the modular holder of FIG. 3A, with the token rotated.
Figure 4B:
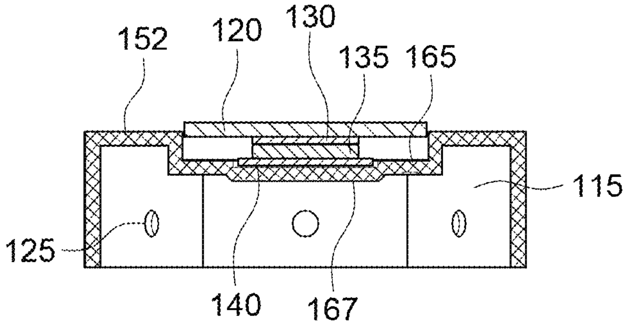
FIG. 4B is a cross-sectional view taken along the line C-C of FIG. 4A.
Figure 4C:
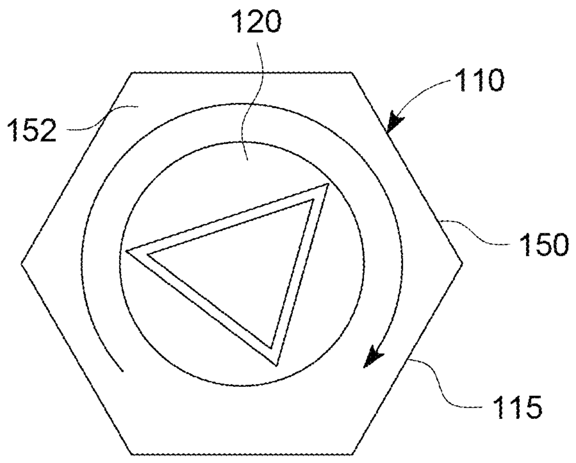
FIG. 4C is a top view of the modular holder of FIG. 4A, depicting a direction of rotation for the token, consistent with aspects.

FIGS. 4A and 4B are similar to the aspect shown in FIGS. 3A and 3B, except that FIG. 4C illustrates that the magnetic connection used to secure the token 120 to the housing 150 allows for the token 120 to be rotated. FIG. 4A shows that the symbol on the front face 152 of the token 120 has been rotated so that the apex previously pointing to the right in FIG. 3A is now rotated 180 degrees and pointing to the left in FIG. 4A. FIG. 4C includes an arrow representing a direction of rotation available for the token 120.

Figure 5A:
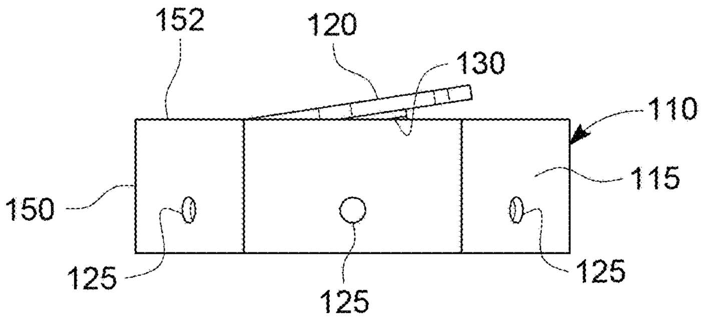
FIG. 5A is a side view of the modular holder of FIG. 2A, consistent with aspects.
Figure 5B:
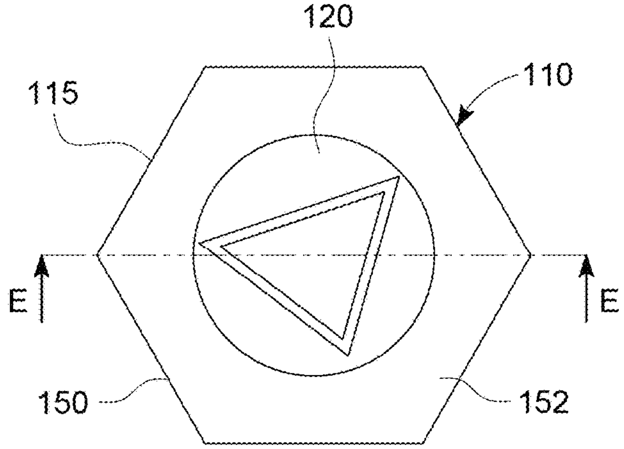
FIG. 5B is a top view of the modular holder of FIG. 5A.
Figure 5C:
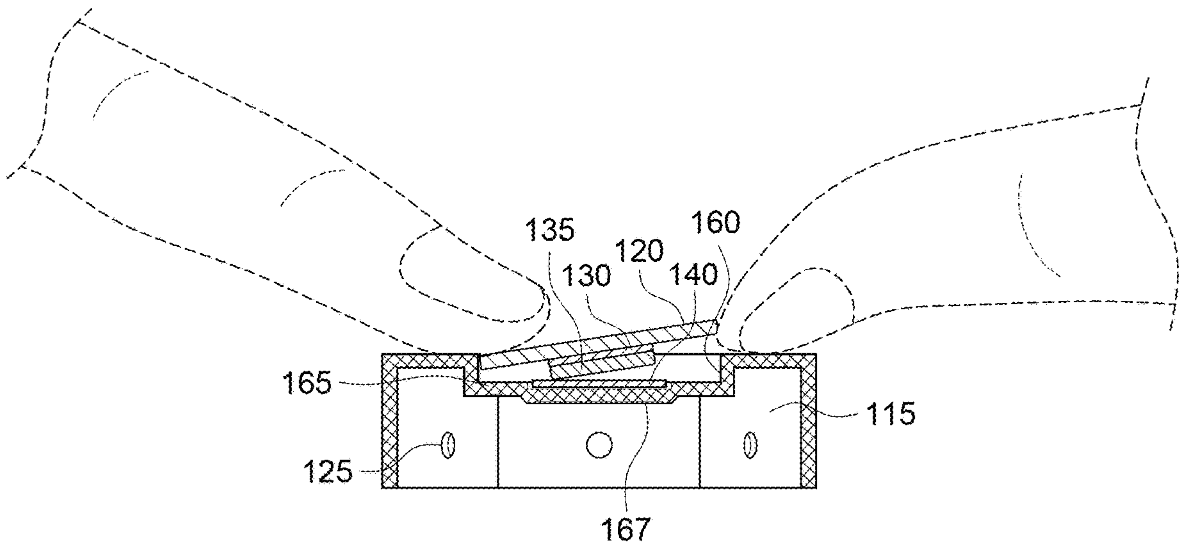
FIG. 5C is a cross-sectional view taken along the line E-E of FIG. 5B.

FIGS. 5A, 5B, and 5C provide additional views of the modular holder 110 assembly. FIGS. 5A, 5B, and 5C illustrate how the clearance around the stack of elements below the token 120 may be leveraged to tilt to token 120 within the recessed sidewall 160. It should be appreciated that the thickness of the magnet 135 and/or the thickness of the metal layer 140 cooperate to provide a space between the outer peripheral portion of the token 120 and outer peripheral portion of the ledge 165 to allow the user to push down on one side of the outer peripheral portion of the token 120 which simultaneously lifts up the opposite side of the token 120. By tilting the token 120 inward into the space inside the recessed sidewall 160 created by the magnet 135 and/or metal layer 140, the leverage exerted may easily break the magnetic attraction of the magnet 135 from the metal layer 140, freeing the token 120 from placement within the modular holder 110. The user can then pull the token 120 up and out of the hole.

While the foregoing aspects included a separate magnet 135 and metal layer 140 in some aspects, the token 120 may be made of metal. The metal layer 140 may be switched out with the magnet 135 affixed to the floor 167. In this aspect, the magnetic attraction becomes direct between the token 120 and the magnet 135. In addition, some aspects may switch the position of magnet 135 and metal layer 140 so that the metal layer 140 is attached to the underside of the token 120 and the magnet 135 is attached to the floor 167.

Figure 6A:
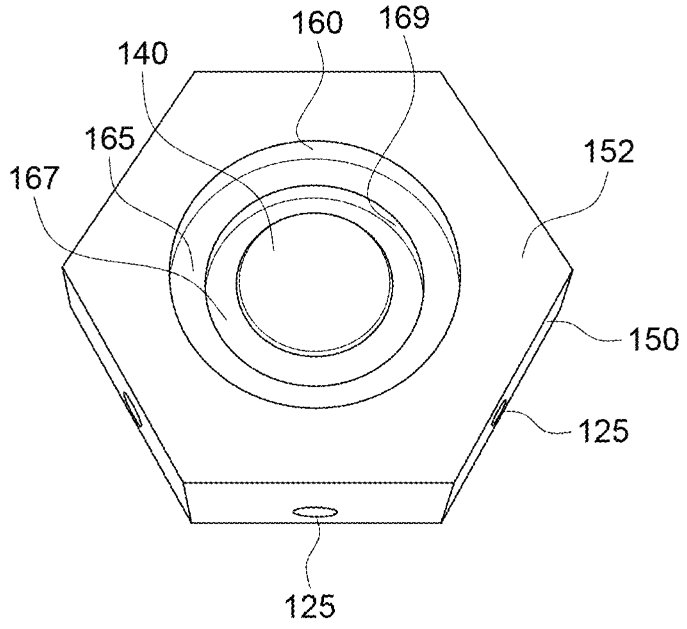
FIG. 6A is a top perspective view of a modular holder without a token, consistent with aspects.
Figure 6B:
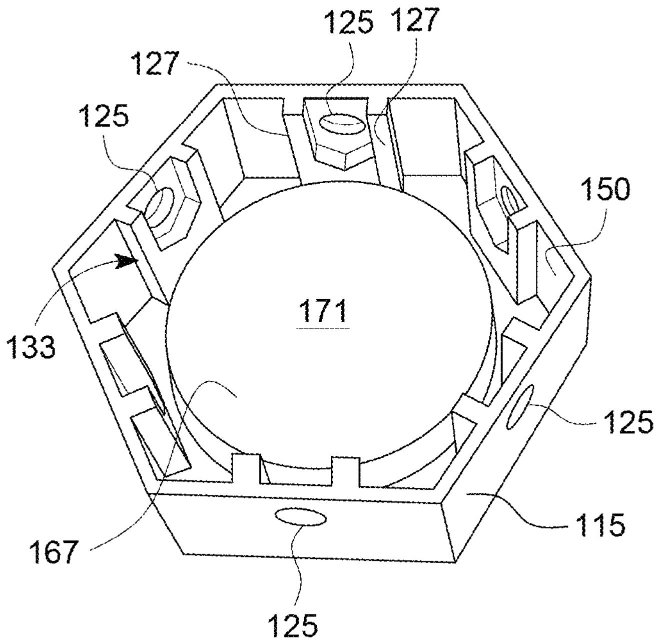
FIG. 6B is a rear perspective view of the modular holder of FIG. 6A., according to an aspect.

FIGS. 6A and 6B illustrate orthogonal views of the modular holder 110 assembly. FIG. 6A shows the elements of the modular holder 110 without the elements of the token 120 in place. The metal layer 140 can be seen situated within the well 169. The rear side of the modular holder 110 is shown in FIG. 6B. As shown in FIG. 6B, the rear side of the floor 167 has a rear facing surface 171. The modular holder 110 may include a plurality of fastener hubs 133 that are positioned to receive fasteners 170 therethrough (seen in FIGS. 7 and 8). The fastener hubs 133 may include guide walls 127. The guide walls 127 may provide structural support for the assembly reinforcing the integrity of the sides 115 when fasteners 170 are installed.

Referring now to FIG. 7, the connection of two modular holders 210 together is shown according to an aspect. The modular holder 210 is similar to the modular holder 110 except that on the rear side, the guide walls 127 and fastener hubs 133 are omitted around the holes 125. The rear side of the floor 167 may include an aesthetic design or logo. In the example shown, the fastener 170 includes a screw 172 secured by a nut 174 through the hole 125, adjoining two sides 115 of adjacent modular holders 210. The length of the screw 172 permits sufficient clearance with the edge of the floor 167. While a screw 172 and nut 174 combination was shown, it will be understood that other aspects may use different fastener 170 combinations including for example, press fit pins, pegs, and pairs of magnets, etc.

Figure 8:
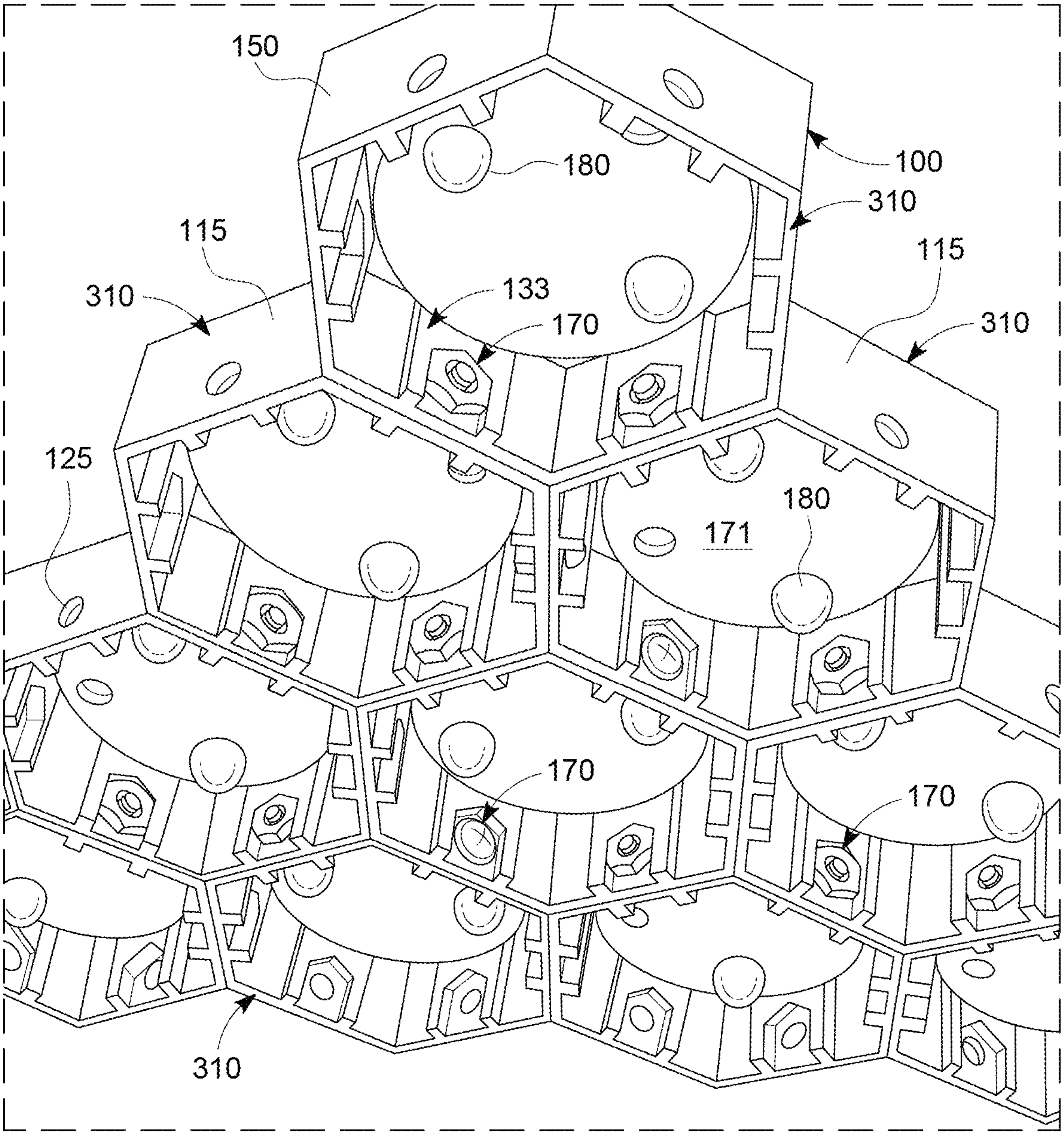
FIG. 8 is a rear perspective view of the system re-arranged in accordance with another aspect.

FIG. 8 shows a rear view of the system 100 where a plurality of fasteners 170 are shown connecting adjacent modular holders 310 together to provide another user generated shape for the display. In this user generated arrangement, a pyramidal configuration is generated. The modular holder 310 is similar to the modular holder 110 except that the rear surface 171 may include bumps 180. The bumps 180 may be useful in rotating the modular holder 310 when a user is manipulating the orientation of the modular holder 310 to connect with an adjacent modular holder 310 (or other variations on the modular holders described above).

FIG. 9 shows further versatility in the possible user arranged configurations of the system 100 available. The modular holders 110 are not necessarily connected on all sides 115 to other modular holders 110. The flexibility in connection provides connectability in linear directions (for example, spread out to the sides) as well as in clusters of modular holder 110 connections. As may be appreciated, such versatile possibilities may motivate the user to acquire more tokens to build more complex arrangements when more modular holders 110 become available. The arrangements can spread in a combination of directions. Yet the thickness of each modular holder 110 and the lightweight nature of the materials used (which may include for example, lightweight plastic) provide a stable structure that sometimes can be supported by a single side 115 of a modular holder 110 at the bottom of the system 100.

Those of skill in the art would appreciate that various components may be arranged differently (e.g., arranged in a different order, or partitioned in a different way) all without departing from the scope of the subject technique or technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technique and technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "10 mm" is intended to mean "about 10 mm".

What is claimed is:

1. A display presentation system for displaying a plurality of tokens, comprising:

a plurality of modular holders, each modular holder comprising:

a housing having a front surface;

a recessed surface extending below the front surface;

a floor at a bottom of the recessed surface;

a metal layer positioned on top of the floor and under the token, wherein the metal layer has a circumference smaller than a circumference of the token;

a magnet positioned on top of the floor and under the token, wherein the magnet has a circumference smaller than the circumference of the token, wherein:

either the magnet or the metal layer are attached to the token and cooperate to provide a magnetic force attaching the token to the housing, an empty space is present between a sidewall of the recessed surface and edges of the metal layer and magnet, and an edge of the token is tiltable into the empty space to break the magnetic force and remove the token from the housing; and a system of fasteners, wherein the plurality of modular holders are connectable in multiple directions into a variety of user designed shapes via connection and reconnection of the system of fasteners to the plurality of modular holders.

2. The system of claim 1, wherein the plurality of modular holders are connectable in a linear direction.

3. The system of claim 1, wherein the plurality of modular holders are connectable in a cluster.

4. The system of claim 1, wherein the recessed surface is configured to allow the token to rotate inside the recessed surface.

5. The system of claim 1, wherein each modular holder is hexagonal.

6. The system of claim 5, wherein each of the plurality of modular holders has six sidewalls, wherein the system of fasteners are configured to connect adjacent sidewalls of adjacent modular holders together, and wherein the plurality of modular holders are configured to be re-configured by disconnecting and reconnecting the fasteners.

7. The system of claim 5, wherein one or more of the modular holders are not connected via the plurality of fasteners and are configured to be positioned forward of, or rearward of a front plane of the modular display system.

8. The system of claim 1, wherein the plurality of modular holders are configured to free-stand on a support surface.

9. The system of claim 1, wherein the fasteners include:

a screw configured to pass through aligned vias of adjacent modular holder sidewalls; and a nut configured to engage with the screw to secure the adjacent modular holder sidewalls together.

10. The system of claim 1, further comprising a depression in the front surface of each of the plurality of modular holders.

* * * * *